United States Patent [19]
Kawai

[11] Patent Number: 5,962,100
[45] Date of Patent: Oct. 5, 1999

[54] OPTICAL INFORMATION RECORDING MEDIUM

[75] Inventor: Shoichi Kawai, Kuwana, Japan

[73] Assignee: Denso Corporation, Kariya, Japan

[21] Appl. No.: 08/901,271

[22] Filed: Jul. 28, 1997

[30] Foreign Application Priority Data

Jul. 29, 1996 [JP] Japan ................................. 8-199000

[51] Int. Cl.$^6$ .................................................. B32B 3/00
[52] U.S. Cl. .................... 428/64.1; 428/64.4; 428/64.5; 428/457; 428/913; 430/270.13; 430/495.1; 430/945; 369/283
[58] Field of Search ................................. 428/64.1, 64.2, 428/64.4, 64.5, 457, 913; 430/270.13, 495.1, 945; 369/275.1, 283, 288

[56] References Cited

U.S. PATENT DOCUMENTS

| | | | |
|---|---|---|---|
| 5,234,737 | 8/1993 | Ueno et al. | 428/64 |
| 5,314,734 | 5/1994 | Nishida et al. | 428/64 |
| 5,395,669 | 3/1995 | Kawahara et al. | 428/64 |
| 5,418,030 | 5/1995 | Tominaga et al. | 428/64 |
| 5,419,937 | 5/1995 | Coombs et al. | 428/64.1 |

FOREIGN PATENT DOCUMENTS

| | | |
|---|---|---|
| 2-113453 | 4/1990 | Japan . |
| 3-292630 | 12/1991 | Japan . |
| 5-109113 | 4/1993 | Japan . |
| 5-205316 | 8/1993 | Japan . |
| 6-231487 | 8/1994 | Japan . |

*Primary Examiner*—Elizabeth Evans
*Attorney, Agent, or Firm*—Pillsbury Madison & Sutro LLP

[57] ABSTRACT

In a rewritable optical information recording medium, a transparent interference layer, a translucent interference layer, a lower protection layer, a recording layer, an upper protection layer, and a reflection layer are formed on a substrate in that order. The transparent interference layer has a reflectance which changes in accordance with a wavelength of a beam incident on the substrate, and the translucent interference layer has a light transmittance smaller than that of the transparent interference layer. In this constitution, by determining appropriate thicknesses of the above-mentioned layers, a reflectance of a non-recorded portion of the recording medium with respect to a reproducing beam can be increased. Further, reflectances of the non-recorded and recorded portions with respect to a recording and erasing beam can be decreased, so that it becomes easy to record and erase information in the recording medium.

17 Claims, 8 Drawing Sheets

REPRODUCING BEAM

FIG. 3B

REPRODUCING BEAM

FIG. 4A  RECORDING AND ERASING BEAM

FIG. 4B  RECORDING AND ERASING BEAM

LASER BEAM

FIG. 7

LASER BEAM

OPTICAL INFORMATION RECORDING MEDIUM

CROSS REFERENCE TO RELATED APPLICATION

This application is based upon and claims the benefit of priority of the prior Japanese Patent Application No. 8-199000 filed on Jul. 29, 1996, the contents of which are incorporated herein by reference.

BACKGROUND OF THE INVENTION

1. Field of the Invention

The present invention relates to a rewritable optical information recording medium capable of reproducing, erasing, and recording information by means of radiation beam incident on the recording medium.

2. Related Arts

Recently, various kinds of phase change type optical information recording media have been proposed. A typical phase change optical information recording medium has a substrate, a lower protection layer, a recording layer, an upper protection layer, and a reflection layer are formed on the substrate in that order. The crystal phase of the recording layer changes between a crystalline phase and an amorphous phase in response to irradiation of a beam, so that the reflectance of the recording layer changes, enabling the recording medium to rewrite information. However, thus rewritable recording medium must satisfy the same standard requirements as those of conventional optical recording media for reproducing only such as the Compact Disc (CD), the Laser Disk (LD) and the like, and this calls for an initial reflectance of 65% or more. The initial reflectance means a reflectance of a non-recorded portion of the recording medium.

To increase the initial reflectance, the inventor of the present invention proposed a rewritable recording medium in JP-A-5-205316. The proposed rewritable recording medium has a lower protection stack composed of several transparent layers having a different refractive index, respectively. Each thickness of the transparent layers is controlled to increase the initial reflectance of the recording medium. However, to obtain a sufficient initial reflectance, it is necessary to pile many transparent layers for the lower protection layer. As a result, the total thickness of the recording medium is increased, thereby being likely to produce cracks therein. In addition, the manufacturing cost of the recording medium is increased.

SUMMARY OF THE INVENTION

The present invention has been made in view of the above-mentioned problems and an object of the present invention is to provide a rewritable optical information recording medium having a high initial reflectance without increasing its thickness.

An optical information recording medium according to the present invention has an optical interference layer between a substrate and a lower protection layer. The optical interference layer includes a first interference layer having a reflectance which changes in accordance with a wavelength of a beam incident on the recording medium and a second interference layer having a light transmittance smaller than that of the first interference layer. By employing the first interference layer having the reflectance which changes in accordance with the wavelength of the beam, in a case where a reproducing beam and a recording and erasing beam having different wavelengths each other are utilized, a reflectance of a non-recorded portion of the recording medium with respect to the reproducing beam can be increased, and simultaneously reflectances of the non-recorded and a recorded portion of the recording medium with respect to the recording and erasing beam can be decreased. As a result, it becomes easy to record and reproduce information in the recording medium and a power of the recording and erasing beam can be decreased. In addition, by employing the second interference layer having the light transmittance smaller than that of the first interference layer, an initial reflectance of the recording medium can be increased. Thicknesses of layers constituting the recording medium and including the first and second interference layers are determined so that the reflectance of the non-recorded portion with respect to the reproducing beam is 65% at least, an amplitude modulating factor which is a percentage of a difference between the reflectances of the non-recorded and recorded portions of the recording medium relative to the reflectance of the non-recorded portion is 60% at least, and the reflectances of the non-recorded and recorded portions with respect to the recording and erasing beam are 50% at most, respectively.

By determining the appropriate thicknesses of layers of the recording medium, although the recorded portion has the reflectance smaller than that of the non-recorded portion with respect to the reproducing beam, the recorded portion can have the reflectance larger than that of the non-recorded portion with respect to the recording and erasing beam. In this case, an amount of jitter (variations in a waveform) of a reproducing signal from the recording medium which has been overwritten becomes small. To the contrary, the recorded portion can have the reflectance smaller than that of the non-recorded portion with respect to both of the reproducing beam and the recording and erasing beam. In this case, the reproducing beam can have the same wavelength as the recording and erasing beam.

To realize the above-mentioned effects, in the present invention, with respect to the reproducing beam perpendicularly entering the recording medium, beams reflected from the first and second interference layers and the recording layer on a substrate side with respect to the recording layer are controlled to be substantially in-phase each other, and beams reflected from the lower surface of the recording layer and the reflection layer on an opposite side of the substrate with respect to the recording layer are controlled to be substantially anti-phase relative to the beams reflected from the first and second interference layers. Further, with respect to the recording and erasing beam, the beam reflected from the first interference layer is controlled to be substantially anti-phase with respect to the beams reflected from the second interference layer and the recording layer on the substrate side. As a result, as mentioned above, the reflectance of the non-recorded portion of the recording medium with respect to the reproducing beam can be increased, and a light absorptance of the recording medium relative to the recording and erasing beam can be increased.

BRIEF DESCRIPTION OF THE DRAWINGS

Other objects and features of the present invention will become more readily apparent from a better understanding of the preferred embodiments described below with reference to the following drawings.

DETAILED DESCRIPTION OF THE PREFERRED EMBODIMENTS

Embodiments according to the present invention will be described hereinunder with reference to the drawings.

(First Embodiment)

Figure 1:
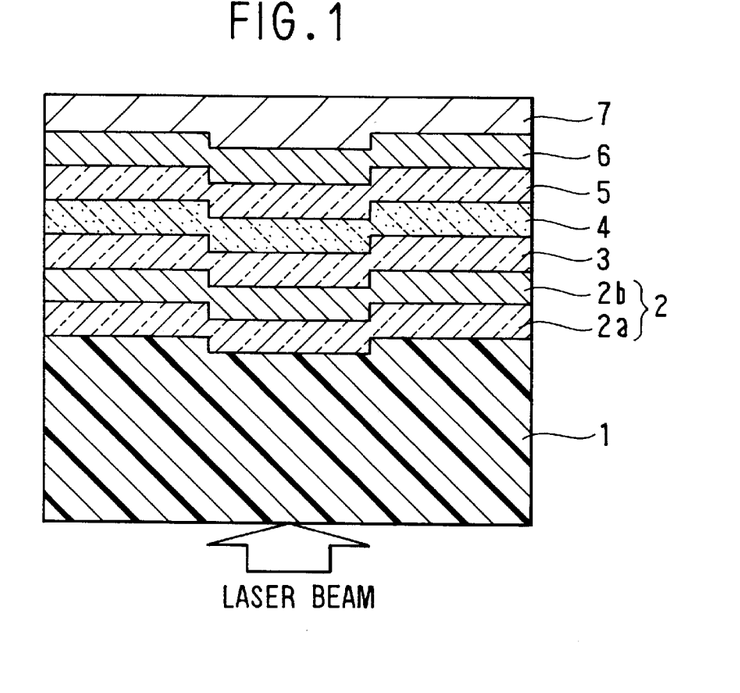
FIG. 1 is a cross-sectional view showing an optical information recording medium in a first embodiment according to the present invention.

An optical information recording medium in a first embodiment shown in FIG. 1 has a disk-like transparent substrate 1 made of glass or plastic and an optical interference stack 2 formed on the substrate 1. The interference stack 2 has a transparent interference layer (a first interference layer) 2a and a translucent interference layer (a second interference layer) 2b. The transparent interference layer 2a has a light transmittance larger than that of the translucent interference layer 2b, and a light absorptance smaller than that of the translucent interference layer 2b. The reflectance and refractive index of the transparent interference layer 2a change in accordance with a wavelength of an incident beam. In more concrete, the substrate 1 is made of polycarbonate having a refractive index of 1.58. The transparent interference layer 2a is made of magnesium fluoride ($MgF_2$) having a refractive index of 1.38, and the translucent interference layer 2b is made of gold (Au) having a refractive index of 0.2–4.81. The thicknesses of the transparent and translucent interference layers 2a and 2b are 150 nm and 10 nm, respectively.

On the interference stack 2, a lower protection layer 3 made of a $ZnS$—$SiO_2$ mixture having a refractive index of 2.0, a recording layer 4 made of a Ge—Sb—Te compound, an upper protection layer made of the $ZnS$—$SiO_2$ mixture, and a reflection layer 6 made of Au are formed in that order. The thicknesses of the lower protection layer 3, the recording layer 4, the upper protection layer 5, and the reflection layer 6 are 230 nm, 18 nm, 20 nm, and 100 nm, respectively. These layers can be formed by a sputtering method or an evaporation method. In this case, it is desired that each variation of the thicknesses is less than 1.5%. Further, an over coating layer 7 is formed on the reflection layer 6. Here, as shown in FIG. 1, it should be noted that the substrate 1 has pre-grooves (guide grooves) having a rectangular shape in cross section for guiding a beam incident thereon.

Next, characteristics of the recording medium having the above-mentioned constitution will be hereafter described. By irradiating beam on the substrate 1, the crystal phase of the recording layer 4 reversibly changes. That is, the recording layer 4 undergoes a phase change between an amorphous phase and a crystalline phase so that a non-recorded portion has the crystalline phase and a recorded portion has the amorphous phase.

Figure 2:
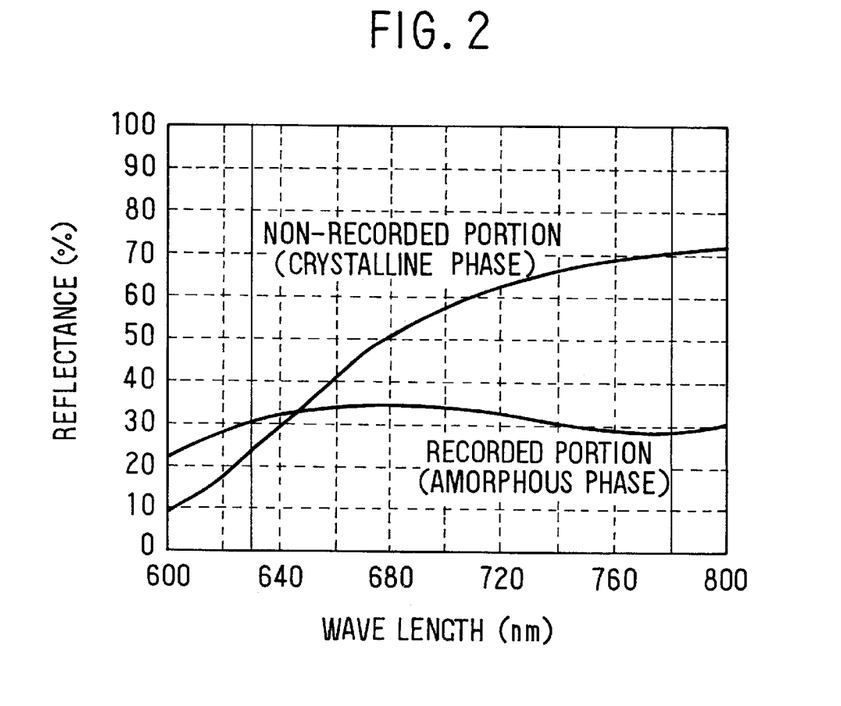
FIG. 2 is a graph showing reflectance characteristics of non-recorded portion (crystalline phase) and recorded portion (amorphous phase) of the recording medium with respect to a wavelength of an incident beam in the first embodiment.

FIG. 2 shows reflectance characteristics of the non-recorded portion (crystalline phase) and the recorded portion (amorphous phase) of the recording medium with respect to the wavelength of the incident beam. For example, when the wavelength of the incident beam was 780 nm compatible with a reproducing beam for the CD, the reflectance of the non-recorded portion was 70.3%, while the reflectance of the recorded portion was 27.8%. When the wavelength of the incident beam was 630 nm corresponding to that of a recording and erasing beam, the reflectance of the non-recorded portion was 23.8%, while the reflectance of the recorded portion was 27.8%.

In the above-mentioned recording medium, in a case where the recorded portion having the amorphous phase has a light absorptances larger than that of the non-recorded portion having the crystalline phase with respect to the recording and erasing beam, it is known that an amount of jitter of the reproducing signal from the recording medium which has been overwritten becomes large. The jitter means variations in the waveform of the reproducing signal. As opposed to this, in this embodiment, the light absorptances of the non-recorded and the recorded portions with respect to the recording and erasing beam of 630 nm, which were obtained from the above-mentioned reflectances, were 76.2% and 72.2%, respectively. That is, the light absorptance of the non-recorded portion having the crystalline phase was larger than that of the recorded portion having the amorphous phase. As a result, the amount of the jitter of the reproducing signal became small. In addition, both of the light absorptances of the non-recorded and recorded portions with respect to the recording and erasing beam were relatively large, so that it became easy to record and erase information in the recording layer 4 by the beam having a small amount of energy.

On the other hand, when irradiating the beam of 780 nm compatible with the reproducing beam for the CD, the reflectance of the non-recorded portion, which corresponds to the initial reflectance, was 70.3% and satisfies the standard requirement for the CD. The standard requirement with respect to the initial reflectance is over than 65%. In addition, an amplitude modulation factor Φ calculated on the basis of the following formula (1) was over than 60%, and this also satisfies the standard requirement for the CD.

$$\Phi = ((ER1 - WR1)/ER1) \times 100 (\%) \quad (1)$$

wherein ER1 is the reflectance of the non-recorded portion with respect to the reproducing beam, and WR1 is the reflectance of the recorded portion with respect to the reproducing beam. Accordingly, it is apparent that a reproducing driving apparatus (a CD player) can be adopted to the optical information recording medium in this embodiment.

Figure 11:
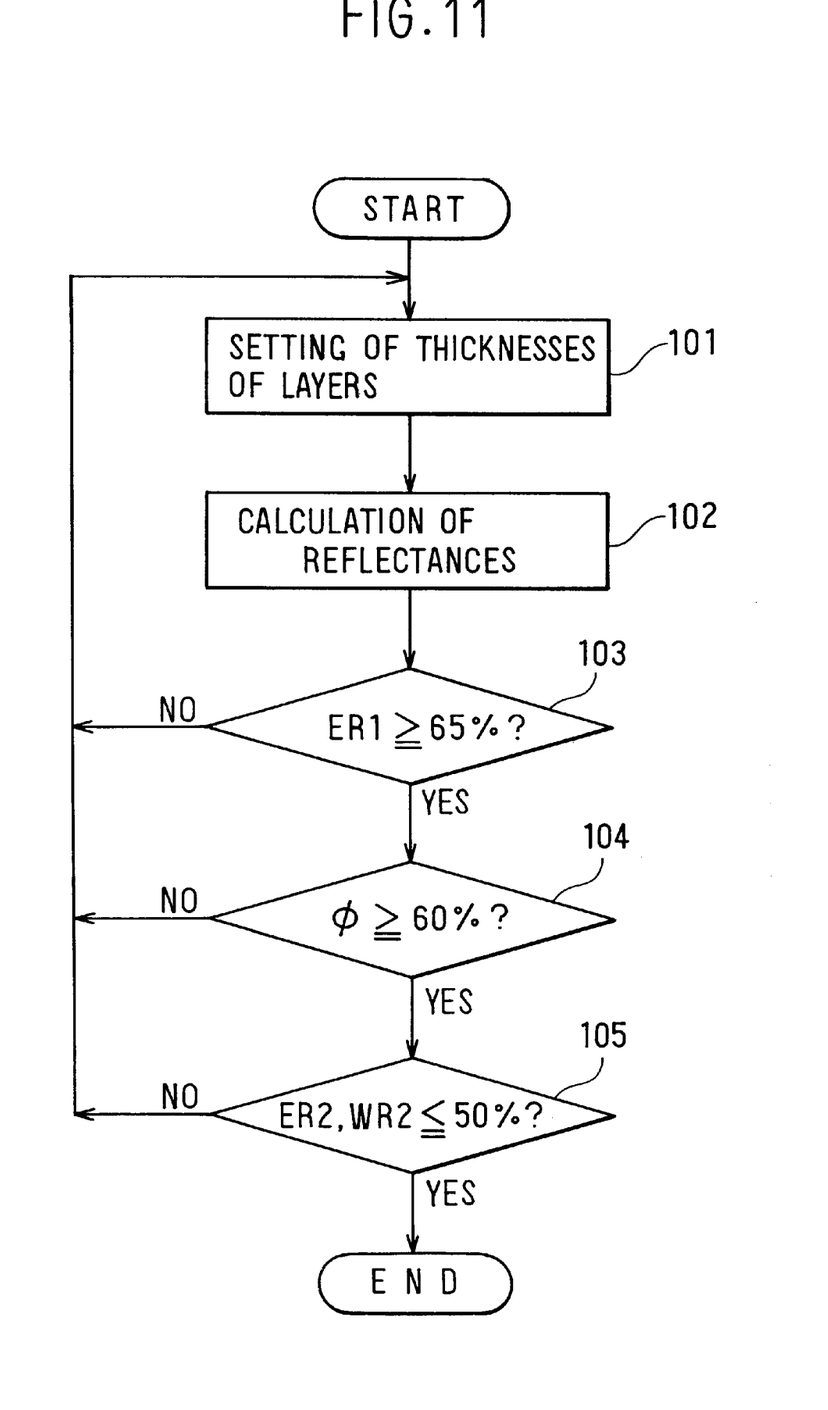
FIG. 11 is a flowchart for explaining a method of determining thicknesses of layers constituting the recording medium in the present invention.

In the present invention, the thicknesses of the layers constituting the recording medium are determined in the following way in order to realize the above-mentioned characteristics shown in FIG. 2. That is, as shown in FIG. 11, first, in a step 101, the thicknesses of the layers of the recording medium are set in advance. By using the thicknesses, in a step 102, the reflectances ER1 and WR1 of the non-recorded and recorded portions with respect to the reproducing beam and the reflectances ER2 and WR2 of the non-recorded and recorded portions with respect to the recording and erasing beam are calculated on the basis of an well-known formula concerning an optical interference phenomenon of thin layers. The detail description of the formula is here omitted. According to the calculation in the step 102, as shown in steps 103 to 105, in a case where the reflectance ER1 of the non-recorded portion with respect to the reproducing beam is equal to or more than 65%, the amplitude modulation factor Φ calculated from the formula (1) using the reflectances ER1 and WR1 is equal to or more than 60%, and the reflectances ER2 and WR2 of the non-recorded and recorded portions with respect to the recording and erasing beam is equal to or less than 50%, the thickness of the layers are determined.

Figure 3A:
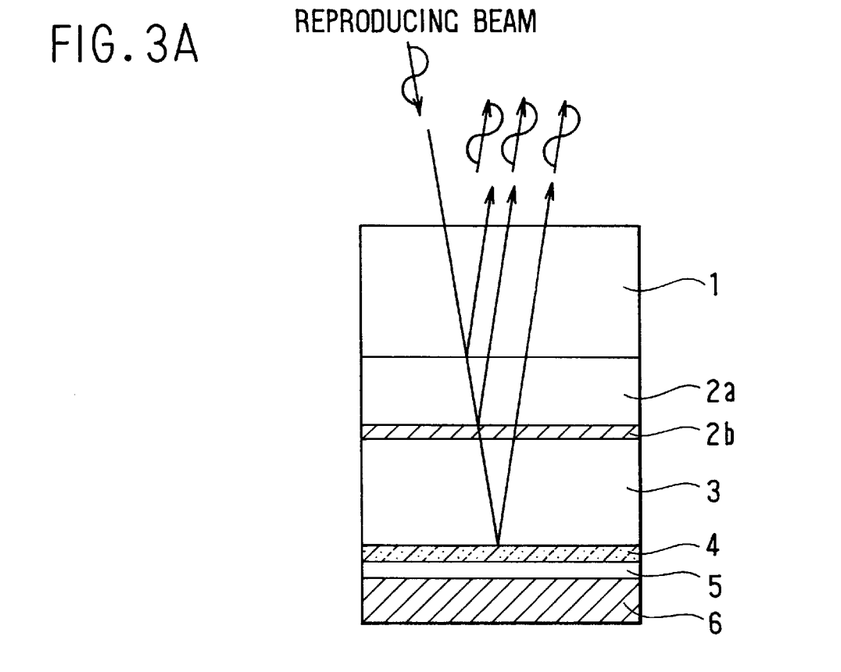
FIGS. 3A and 3B are schematic views for explaining phase relationships of reflected beams from the non-recorded portion and the recorded portion of the recording medium in a case where the wavelength of the incident beam corresponds to that of a reproducing beam in the first embodiment.
Figure 3B:
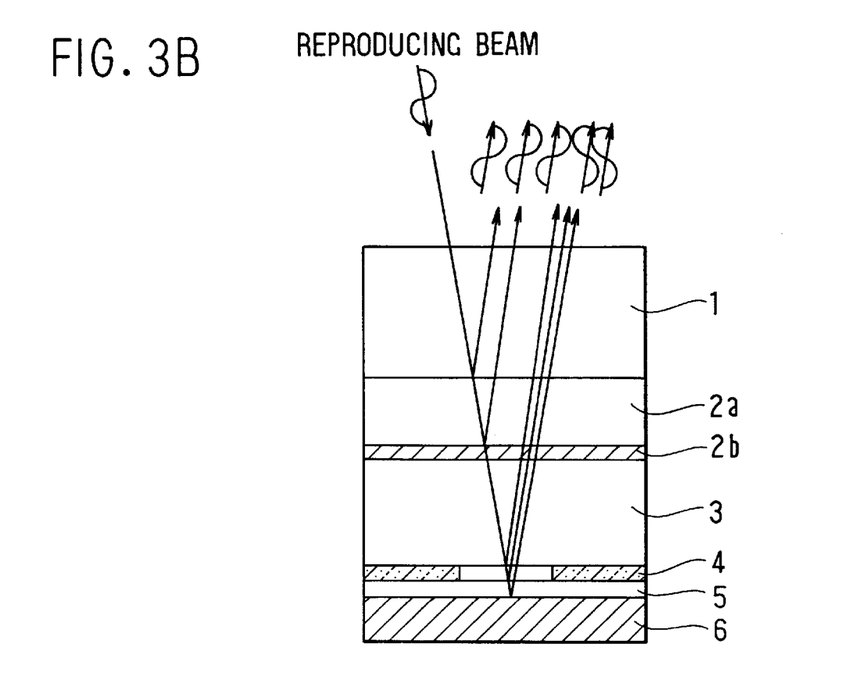

Next, the effects of the above-mentioned constitution of the recording medium and the determination of the thicknesses of the layers of the recording medium in the present invention will be described from the point of view of reflected beams from the recording medium. It is assumed that the incident beam has a complete phase such as a laser beam and perpendicularly enters the surface of the substrate 1. First, as shown in FIGS. 3A and 3B, with respect to the incident beam having the same wavelength as that of the reproducing beam, each thickness of the transparent and translucent interference layers 2a and 2b, and the lower protection layer 3 is determined so that the beams reflected from the layers provided on a substrate side with respect to the recording layer 4 are in-phase each other. Simultaneously, with respect to the reproducing beam, the thicknesses of the recording layer 4 and the underlying layers of the recording layer 4 are determined so that the beams reflected from the surface of the recording layer 4 on a reflection layer side with respect to the recording layer 4 and from the reflection layer 6 are anti-phase relative to the beams reflected from the layers provided on the substrate side with respect to the recording layer 4. Here, in the step of setting the thicknesses of the layers to control the above-mentioned phase relationships between the reflected beams, optical path length difference between the reflected beams are considered.

In the non-recorded portion, because the recording layer 4 has the crystalline phase, the light absorptance is large so that the linear attenuation coefficient is large. Hence, as shown in FIG. 3A, the beam cannot reach the underlying layers of the recording layer 4. However, because the beams reflected from the layers provided on the substrate side with respect to the recording layer 4 are in-phase each other, the total intensity of the beams reflected from the non-recorded portion becomes large, thereby resulting in a high reflectance. As opposed to this, in the recorded portion, because the recording layer 4 has the amorphous phase, the recording layer 4 has a small linear attenuation coefficient and a large light transmittance. Hence, as shown in FIG. 3B, the beam reaches the upper protection layer 5 and the reflection layer 6 to be reflected therefrom. However, because the beams reflected from the upper protection layer 5 and the reflection layer 6 are anti-phase relative to the beams reflected from the layers provided on the substrate side with respect to the recording layer 4, the total intensity of the beams reflected from the recorded portion becomes small compared to the non-recorded portion, thereby resulting in a low reflectance. Consequently, the amplitude modulation factor becomes large.

Figure 4A:
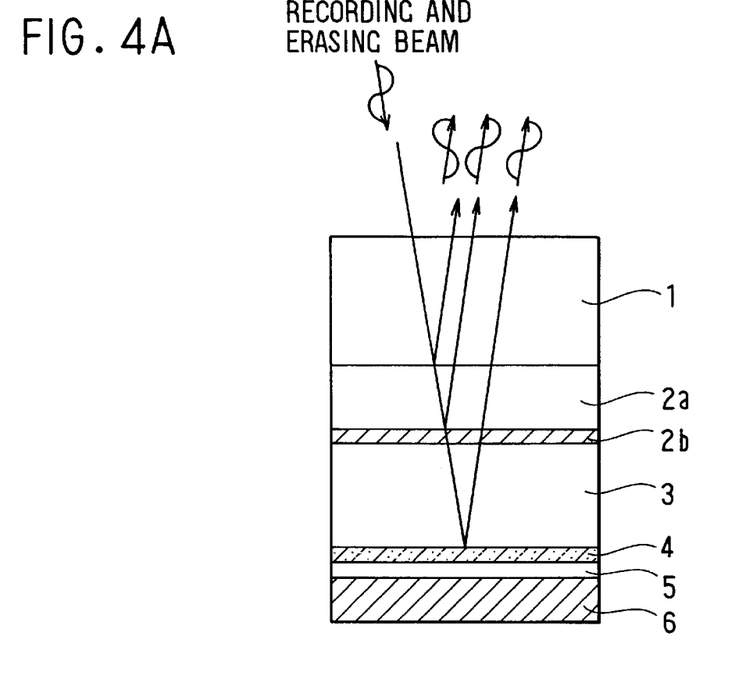
FIGS. 4A and 4B are schematic views for explaining phase relationships of reflected beams from the non-recorded portion and the recorded portion of the recording medium in a case where the wavelength of the incident beam corresponds to that of a recording and erasing beam in the first embodiment.
Figure 4B:
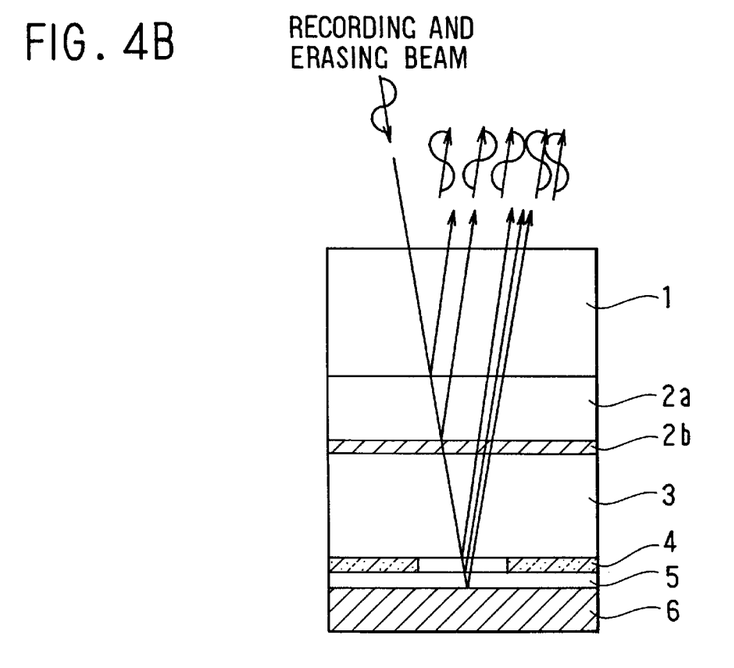

Simultaneously, as shown in FIGS. 4A and 4B, the thickness of the transparent interference layer 2a is controlled so that the beam reflected from the interface between the substrate 1 and the transparent interference layer 2a (that is, reflected from the transparent interference layer 2a) with respect to the recording and erasing beam is anti-phase relative to that reflected from the transparent interference layer 2a with respect to the reproducing beam. The phase relationships of the other reflected beams are the same as those mentioned above. Accordingly, the beams reflected from the interfaces provided on the upper and lower surfaces of the transparent interference layer 2a (that is, reflected from the transparent and translucent interference layers 2a and 2b) become anti-phase each other. As a result, both of the reflectances from the non-recorded and recorded portions becomes small compared to those with respect to the recording and erasing beam, resulting in sufficient light absorptances of the non-recorded and recorded portions. Consequently, a power of the recording and erasing beam can be decreased.

In a case where the transparent interference layer 2a is directly disposed on the lower protection layer 3 without interposing the translucent interference layer 2b therebetween, the intensity of the beam reflected from the interface between the transparent interference layer 2a and the lower protection layer 3 becomes small compared to the intensity of the beam reflected from the interface between the substrate 1 and the transparent interference layer 2a. In this embodiment, however, because the translucent interference layer 2b is interposed between the transparent interference layer 2a and the lower protection layer 3, the intensity of the beam reflected from the interface between the transparent and translucent interference layers 2a and 2b becomes large. Therefore, the difference in intensity between the beams reflected from the interfaces provided on the upper and lower surfaces of the transparent interference layer 2a becomes small, so that the effects of increasing the reflectance of the non-recorded portion with respect to the reproducing beam and decreasing the reflectances of the non-recorded and recorded portions with respect to the recording and erasing beam can be enhanced.

Figure 5:
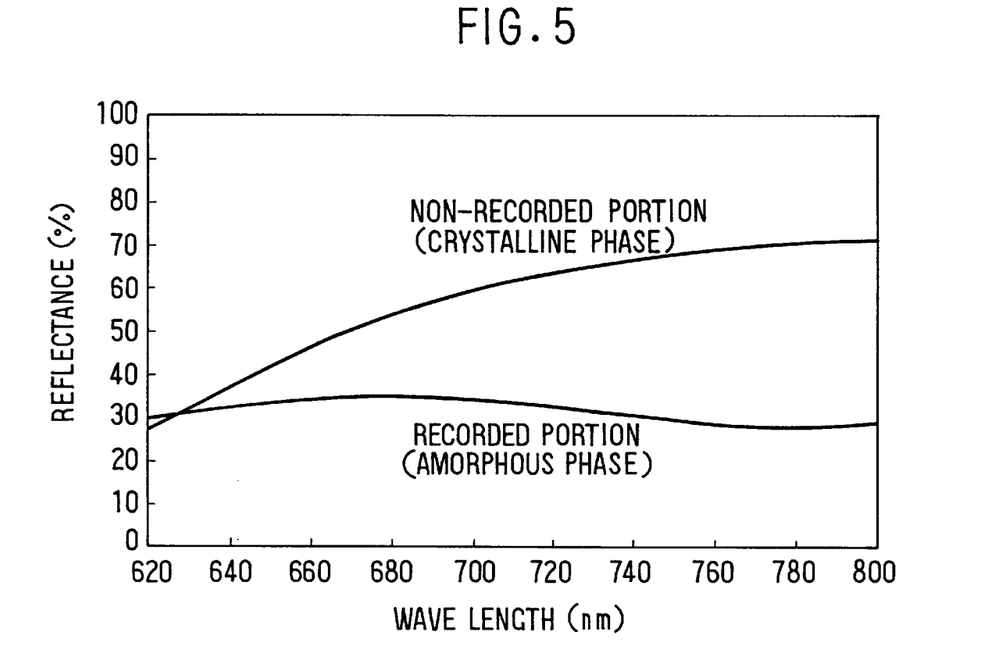
FIG. 5 is a graph showing a reflectance characteristics of a non-recorded portion (crystalline phase) and a recorded portion (amorphous phase) of a recording medium with respect to a wavelength of a incident beam in a modified example according to the first embodiment.

In the first embodiment, as shown in FIG. 2, with respect to the recording and erasing beam having the wavelength of 630 nm, the recorded portion has the reflectance larger than the non-recorded portion. However, with respect to the recording and erasing beam, the non-recorded portion may have the reflectance larger than the recorded portion. The range of the wavelength of the incident beam, in which the non-recorded portion has the reflectance larger than the recorded portion, can be changed by controlling the thicknesses of the layers constituting the recording medium and by controlling the phase relationships of the reflected beams from the layers. For example, when the thicknesses of the transparent interference layer 2a, the translucent interference layer 2b, the lower protection layer 3, the recording layer 4, the upper protection layer 5, and the reflection layer are chosen to be 170 nm, 10 nm, 220 nm, 20 nm, 20 nm, and 100 nm, respectively, the recording medium has reflectance characteristics of the non-recorded and recorded portions with respect to the wavelength of the incident beam shown in FIG. 5. In this case, when a beam having a wavelength of 680 nm is utilized as a recording and erasing beam, the beam can function as a reproducing beam at the same time, so that this case is applicable to the Digital Versatile Disc (DVD).

In the above-mentioned constitution, each of the transparent interference layer 2a, the lower protection layer 3, and the upper protection layer 5 can be made of at least one selected from dielectric materials such as $TiO_2$, $SiO_2$, $Al_2O_3$, $SiO_x$, $Ta_2O_5$, $MoO_3$, $WO_3$, $ZrO_2$, ZnS, $AlN_x$, BN, $SiN_x$, TiN, ZrN, $PbF_2$, $MgF_2$, and the like. The upper protection layer 3 and the lower protection layer 5 may be made of different materials each other. The translucent interference layer 2b can be made of metal, semimetal, or semiconductor, and desirably is made of Au, Si, Cu, or Ag.

Concerning the material forming the recording layer 4, in the above-mentioned Ge—Sb—Te system, it is desired that the mixing ratio of GeTe with respect to $Sb_2Te_3$ is larger than 2 to form the recording layer 4. The reason is because the larger the mixing ratio of GeTe is, the larger the amount of change in linear attenuation coefficient and the amplitude modulation factor become. If the recording layer 4 is only made of GeTe, the coefficient of volume contraction of the recording layer 4 under crystallization becomes large, thereby giving rise to cracks in the recording layer 4. It is desired that the recording layer 4 is made of the Ge—Sb—Te compound, the compositional formula of which is around $Ge_4Sb_1Te_5$. In addition to the Ge—Sb—Te system, the main material constituting the recording layer 4 can be selected from Ge—Te, Ge—Te—Sn, Te—Ge—Sn—Au, Ge—Sb—Te—Pb, Sb—Se, Sb—Te, Sb—Se—Te, In—Te, In—Se, In—Se—Tl, In—Sb, In—Sb—Se, In—Se—Te, In—Sb—Te, In—Sb—Te—Ag, and the like. The layers made of these materials undergo the phase change between the crystalline phase and the amorphous phase by the irradiation of the beam. Further, the recording layer 4 can be made of the other material which undergoes a phase change between two crystalline phases different from each other so that the reflectances thereof change. Such kind of the materials include Ag—Zn and the like.

The reflection layer 6 can be made of metal selected from Al, Ag, Cu, Ni, Fe, Cr, Ti, Ta, Mo, W, Pt, and the like, or alloys of these metals in addition to Au. The reflection layer 6 may be replaced with reflection increasing stack including plurality of inorganic transparent layers which reflect a beam having a specific wavelength. A protection plate or another optical information recording medium similar to the above mentioned recording medium may be bonded on the over coating layer 7 by means of adhesives.

(Second Embodiment)

Figure 6:
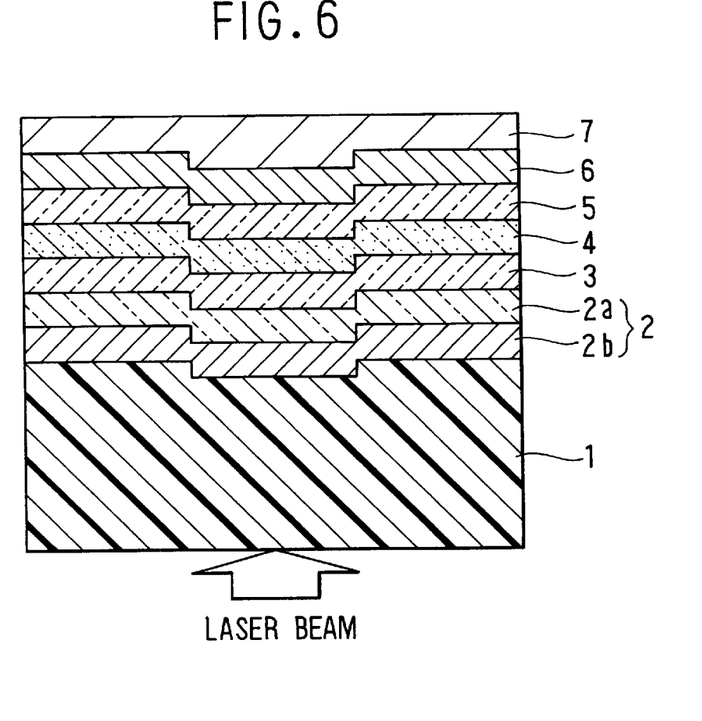
FIG. 6 is a cross-sectional view showing an optical information recording medium in a second embodiment according to the present invention.

In the first embodiment, although the translucent interference layer 2b is deposited on the transparent interference layer 2a, as shown in FIG. 6, the transparent interference layer 2a may be deposited on the translucent interference layer 2b. The other features and effects are the same as those in the first embodiment.

(Third Embodiment)

Figure 7:
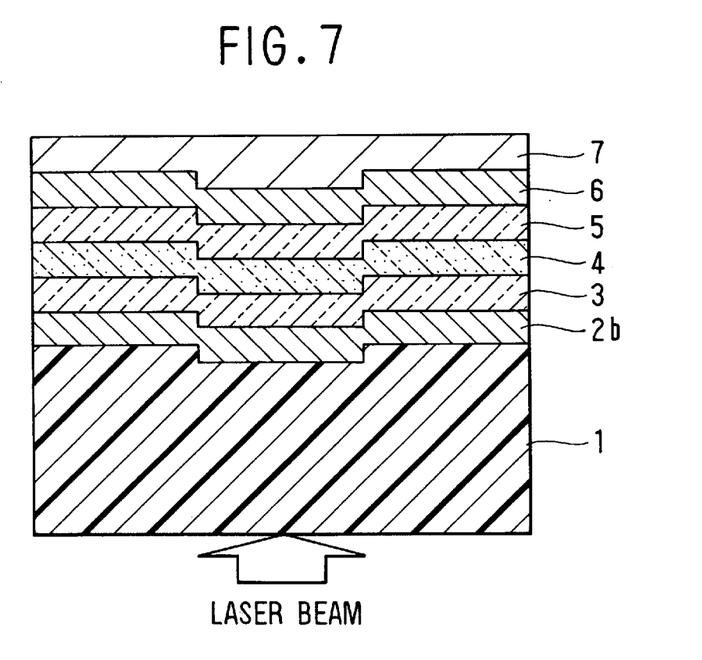
FIG. 7 is a cross-sectional view showing an optical information recording medium in a third embodiment according to the present invention.
Figure 8A:
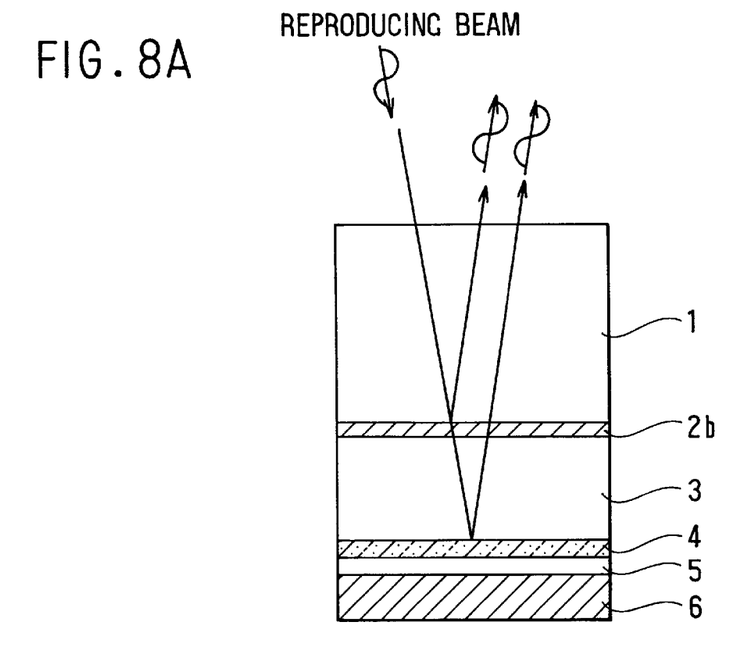
FIGS. 8A and 8B are schematic views for explaining phase relationships of reflected beams from a non-recorded portion and a recorded portion of the recording medium in a case a wavelength of an incident beam corresponds to that of a reproducing beam in the third embodiment.
Figure 8B:
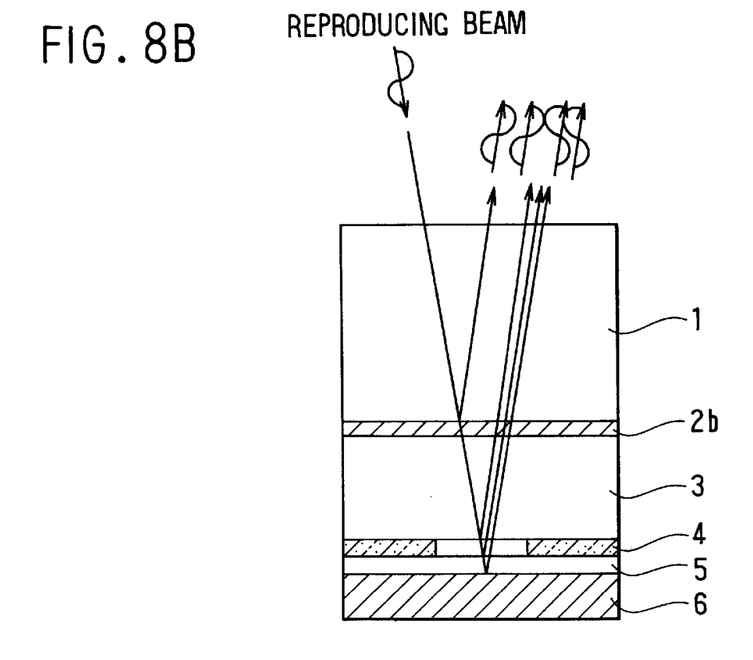
Figure 9A:
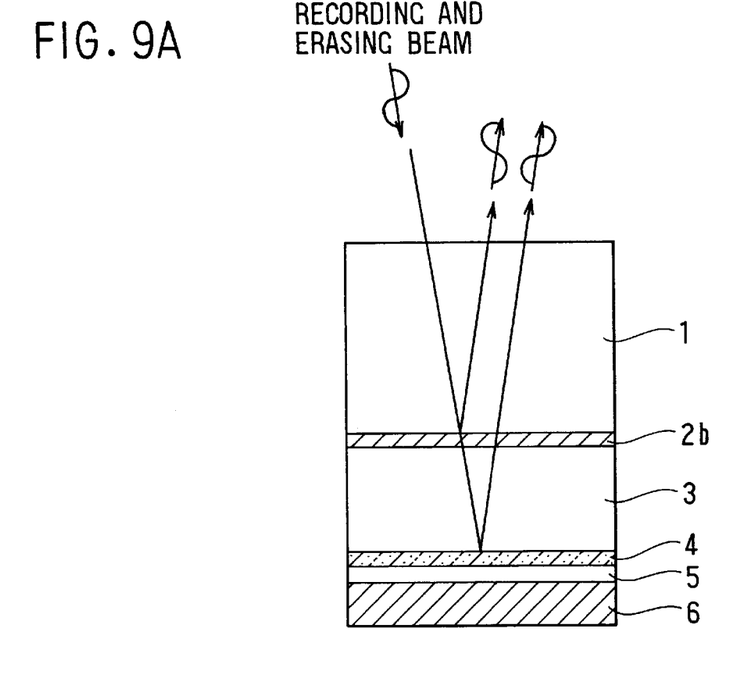
FIGS. 9A and 9B are schematic views for explaining phase relationships of reflected beams from the non-recorded portion and the recorded portion of the recording medium in a case where the wavelength of the incident beam corresponds to that of a recording and erasing beam in the third embodiment.
Figure 9B:
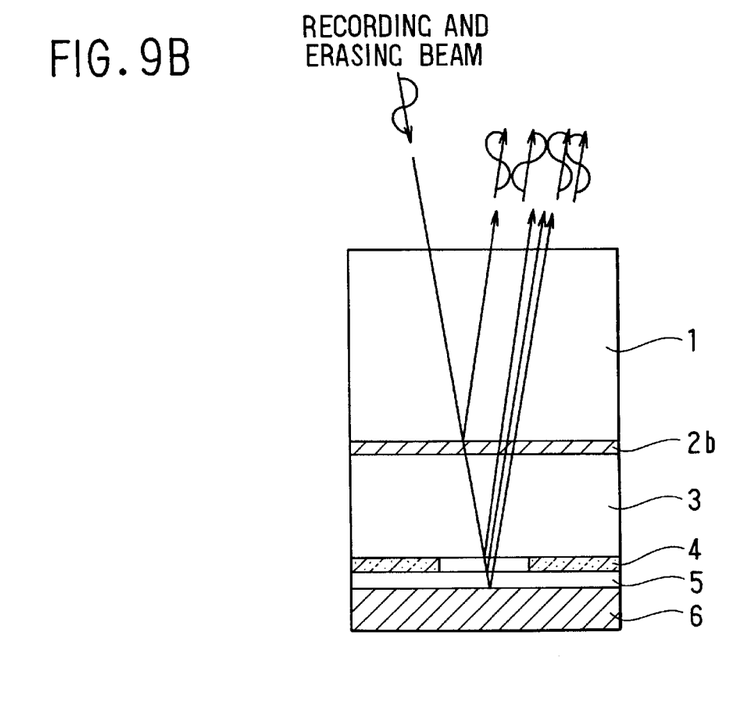

An optical information recording medium according to the present invention can be formed without employing the transparent interference layer 2a as shown in FIG. 7. In the third embodiment, as shown in FIGS. 8A and 8B, with respect to the reproducing beam, the beams reflected from the translucent interference layer 2b and the recording layer 4 are in-phase each other, and the beams reflected from the upper protection layer 5 and the reflection layer 6 are anti-phase relative to the beams reflected from the translucent interference layer 2b and the recording layer 4. Therefore, with respect to the reproducing beam, the reflectance of the non-recorded portion becomes large, while reflectance of the recorded portion becomes small. With respect to the recording and erasing beam, as shown in FIGS. 9A and 9B, the thickness of the translucent interference layer 2b is controlled so that the beam reflected from the translucent interference layer 2b is anti-phase relative to that of the beam reflected from the recording layer 4 on the substrate side with respect to the recording layer 4. Accordingly, in both of the non-recorded portion and the recorded portion, the reflectances with respect to the recording and erasing beam becomes small compared to those with respect to the reproducing beam.

Figure 10:
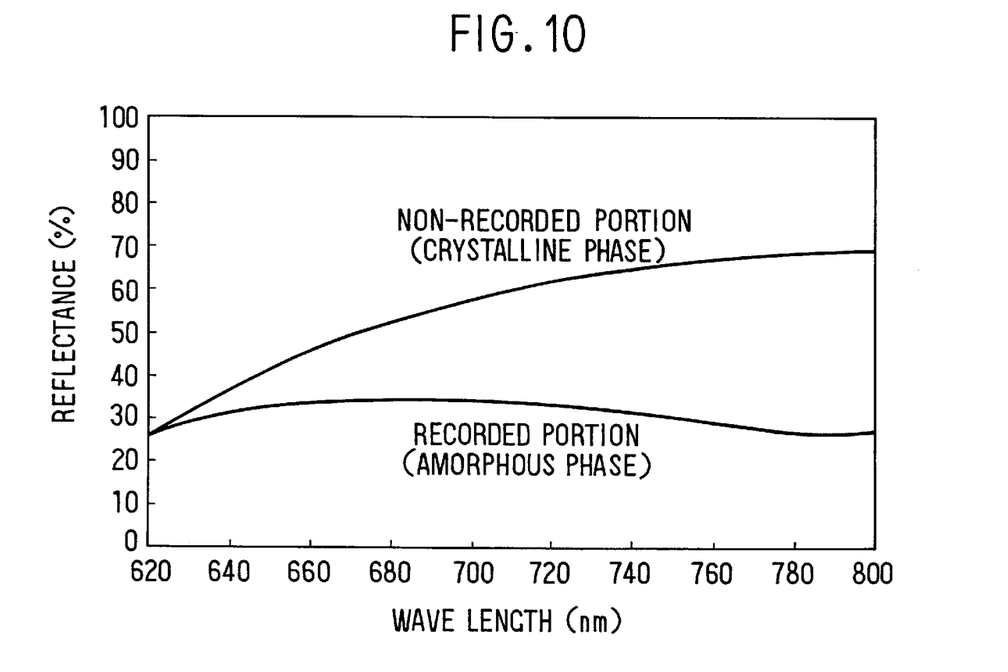
FIG. 10 is a graph showing reflectance characteristics of the non-recorded portion (crystalline phase) and the recorded portion (amorphous phase) of the recording medium with respect to the wavelength of the incident beam in the third embodiment.

The above-mentioned relationships of the phases of the reflected beams can be controlled by adjusting the thicknesses of the layers constituting the recording medium. FIG. 10 shows reflectance characteristics of the non-recorded and recorded portions with respect to the wavelength of the incident beam in the third embodiment. This characteristics were obtained in the case where the thicknesses of the translucent layer 2b, the lower protection layer 3, the recording layer 4, the upper protection layer 5, and the reflection layer 6 are 10 nm, 230 nm, 25 nm, 10 nm, and 100 nm, respectively. The other features and effects are the same as those in the first embodiment. Here, it is not necessary that the reflected beams from the recording medium have completely in-phase or anti-phase relationships therebetween as mentioned above, and the phases of the reflected beams may be shifted each other, provided that reflected beams substantially have in-phase or anti-phase relationships therebetween.

While the present invention has been shown and described with reference to the preferred embodiments, it will be apparent to those skilled in the art that changes in form and detail may be made therein without departing from the scope of the invention as defined in the appended claims.

What is claimed is:

1. An optical information recording medium for recording, erasing, and reproducing information by being irradiated with a beam, the optical information recording medium comprising:

a substrate having an irradiation surface on which the beam is incident;

an optical interference stack provided on a surface of the substrate on a side opposite to the irradiation surface, the interference stack including a first interference layer having a reflectance which changes in accordance with a wavelength of the beam incident on the substrate and a second interference layer having a light transmittance that is smaller than that of the first interference layer;

a first protection layer provided on the optical interference stack;

a recording layer provided on the first protection layer, which undergoes a phase change to vary a reflectance thereof by the irradiation of the beam to have a recorded portion and a non-recorded portion which have reflectances that are different from each other;

a second protection layer provided on the recording layer; and a reflection layer provided on the second protection layer, wherein the beam includes a recording and erasing beam for recording and erasing the information and a reproducing beam for reproducing the information, the reproducing beam having a wavelength that is different from that of the recording and erasing beam, the recording medium has first and second parts respectively corresponding to the non-recorded and recorded portions of the recording layer, and thicknesses of the first and second interference layers, the first and second protection layers, and the recording layer are determined so that;

a reflectance of the first part of the recording medium with respect to the reproducing beam is at least 65%, an amplitude modulation factor with respect to the reproducing beam, which is a percentage of a difference in reflectance between the first and second parts of the recording medium relative to the reflectance of the first part of the recording medium, is at least 60%, and reflectances of the first and second parts of the recording medium with respect to the recording and erasing beam are at most 50%, respectively.

2. An optical information recording medium according to claim 1, wherein the second interference layer is made of a material selected from metal, semimetal, and semiconductor.

3. An optical information recording medium according to claim 1, wherein:

the reflectance of the second part of the recording medium corresponding to the recorded portion is smaller than that of the first part of the recording medium corresponding to the non-recorded portion with respect to the reproducing beam, and the reflectance of the second part of the recording medium is larger than that of the first part of the recording medium with respect to the recording and erasing beam.

4. An optical information recording medium according to claim 1, wherein:

the reflectance of the second part of the recording medium corresponding to the recorded portion is smaller than that of the first part of the recording medium corresponding to the non-recorded portion with respect to the reproducing beam, and the reflectance of the second part of the recording medium is smaller than that of the first part of the recording medium with respect to the recording and erasing beam.

5. An optical information recording medium according to claim 1, wherein:

each layer constituting the recording medium has a first surface on a substrate side and a second surface on a side that is opposite to the substrate side;

first, second and third beams reflected from the first and second surfaces of the first interference layer and from the first surface of the recording layer, respectively, are substantially in-phase with each other with respect to the reproducing beam perpendicularly entering the irradiation surface of the substrate, and fourth and fifth beams reflected from the second surface of the recording layer and the first surface of the reflection layer, respectively, are substantially in an anti-phase relation to the first, second and third beams with respect to the reproducing beam perpendicularly entering the irradiation surface of the substrate.

6. An optical information recording medium according to claim 5, wherein:

the first and second beams reflected from the first and second surfaces of the first interference layer are substantially in an anti-phase relation to each other with respect to the recording and erasing beam perpendicularly entering the irradiation surface of the substrate.

7. An optical information recording medium according to claim 5, wherein:

the first beam is substantially in an anti-phase relation to the second and third beams and the first beam is substantially in-phase relative to the fourth and fifth beams, with respect to the recording and erasing beam perpendicularly entering the irradiation surface of the substrate.

8. An optical information recording medium for recording and erasing information by irradiation with a recording and erasing beam and for reproducing information by irradiation with a reproducing beam having a different wavelength from the recording and erasing beam, the optical information recording medium comprising:

a substrate having an irradiation surface on which the recording and erasing beam and the reproducing beam are incident;

a transparent interference layer provided on the substrate on a side opposite to the irradiation surface and having a first surface facing the substrate and a second surface opposite to the first surface; and a recording layer provided on the transparent interference layer on an opposite side of the substrate with respect to the transparent interference layer and having a third surface facing the second surface of the transparent interference layer, wherein the recording layer undergoes a phase change between a crystalline phase and an amorphous phase to vary a reflectance thereof of the irradiation of the recording and erasing beam, wherein first, second and third beams are beams reflected from the first, second, and third surfaces of the transparent interference layer and the recording layer, respectively, in accordance with irradiation of the beam, the first, second and third beams are substantially in-phase with each other with respect to the reproducing beam perpendicularly entering the irradiation surface of the substrate; and the second and third beams are substantially in-phase with each other and the first beam is substantially in an anti-phase relation to the second and third beams with respect to the erasing and recording beam perpendicularly entering the irradiation surface of the substrate.

9. An optical information recording medium according to claim 8, further comprising:

a translucent interference layer provided on the transparent interference layer on an opposite side of the substrate with respect to the transparent interference layer and having a light transmittance smaller than that of the transparent interference layer.

10. An optical information recording medium according to claim 8, further comprising:

a protection layer provided on the recording layer on an opposite side of the third surface of the recording layer; and a reflection layer provided on the protection layer on an opposite side of the recording layer with respect to the protection layer, wherein fourth and fifth beams reflected from intersections between the recording layer and the protection layer and between the protection layer and the reflection layer are substantially in an anti-phase relation to the second and third beams with respect to both of the reproducing beam and the recording and erasing beam perpendicularly entering the irradiation surface of the substrate.

11. An optical information recording medium for recording, erasing, and reproducing information by being irradiated with a beam, the optical information recording medium comprising:

a substrate having an irradiation surface on which the beam is incident;

an optical interference stack provided on the substrate on a side opposite to the irradiation surface and including a first interference layer and a second interference layer having a light transmittance that is smaller than that of the first interference layer;

a first protection layer provided on the optical interference layer;

a recording layer provided on the first protection layer which undergoes a phase change by the irradiation of the beam to record and erase the information therein and therefrom; and a second protection layer provided on the recording layer, wherein the beam includes a first beam for recording and erasing the information by causing the phase change to the recording layer and a second beam for reproducing the information recorded in the recording layer, the second beam having a wavelength that is different from that of the first beam, and wherein the first interference layer has different reflectances with respect to the first and second beams.

12. An optical information recording medium according to claim 11, wherein:

the recording layer has a recorded portion and a non-recorded portion by the irradiation of the first beam; and the recorded portion has a reflectance smaller than that of the non-recorded portion with respect to the second beam.

13. An optical information recording medium according to claim 12, wherein the recorded portion is an amorphous state and the non-recorded portion is a crystalline state.

14. An optical information recording medium according to claim 11, further comprising a reflection layer provided on the second protection layer on a side that is opposite to the recording layer.

15. An optical information recording medium according to claim 11, wherein the wavelength of the second beam is longer than that of the first beam.

16. An optical information recording medium according to claim 11, wherein the first interference layer is transparent and the second interference layer is translucent.

17. An optical information recording medium according to claim 11, wherein the first interference layer is made of magnesium fluoride and the second interference layer is made of gold.

* * * * *